Patented Feb. 20, 1934

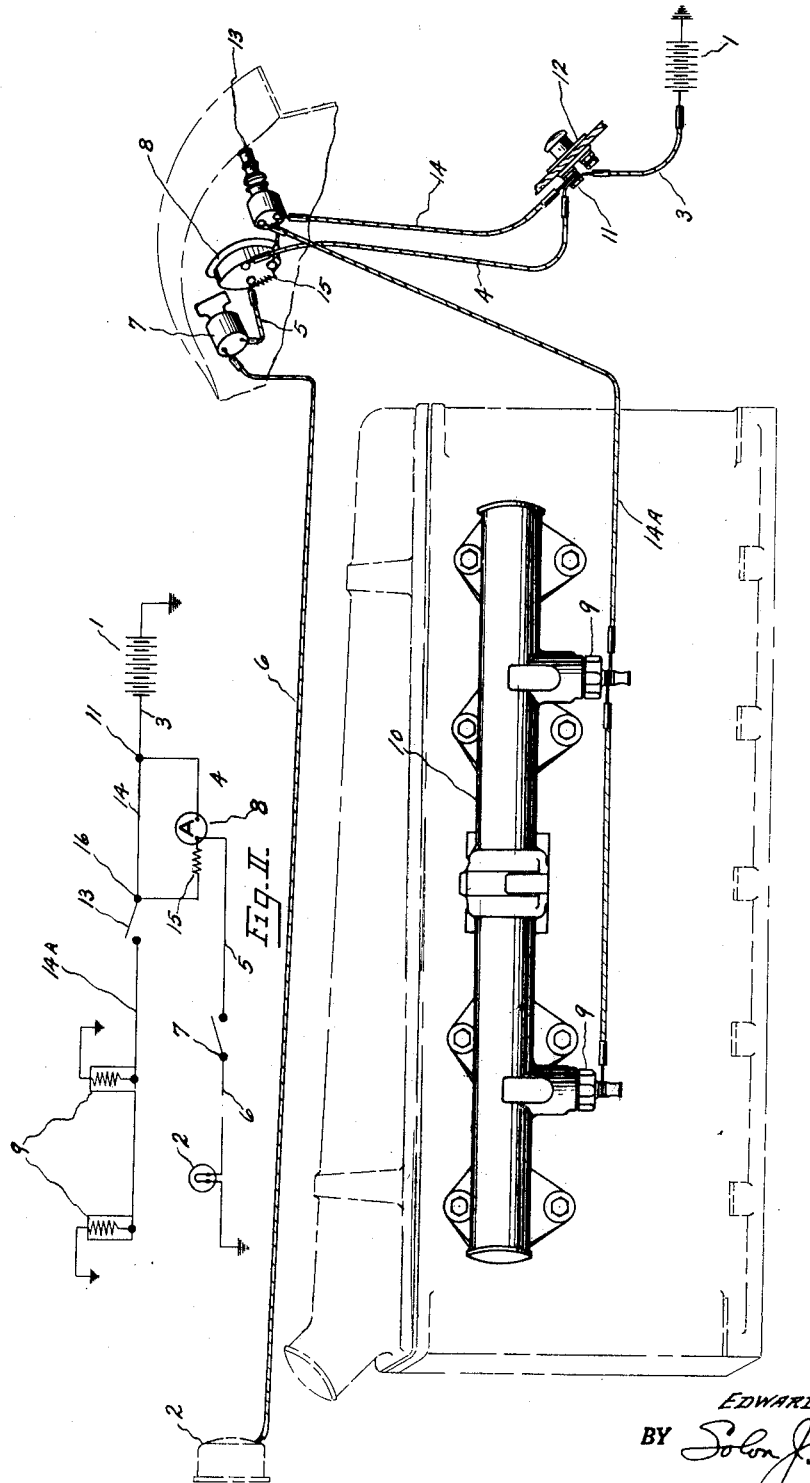

1,948,443

UNITED STATES PATENT OFFICE 1,948,443

MOTOR VEHICLE ELECTRIC SYSTEM

Edward E. Huntington, Toledo, Ohio, assignor to The Willys-Overland Co., Toledo, Ohio, a corporation of Ohio Application September 4, 1926. Serial No. 133,684

1 Claim. (Cl. 177—311)

This invention relates to current indicators for automotive vehicle electrical circuits and more particularly to current indicators for electrically heated fuel vaporizers.

One object of the invention is to provide an electric circuit for an electrically heated fuel vaporizer that will permit the use of a current indicator normally calibrated for and used in a circuit carrying far less current.

Another object of the invention is to provide an electric circuit for an automotive vehicle in which a current indicator may serve to accurately indicate, in standard units, a normal current of low value, and to intermittently serve as an indicator of electric current flow in a circuit having a flow beyond the capacity of the indicator.

Another object of the invention is to provide an electric circuit that will permit the use of an ordinary calibrated ammeter of the electrical system to act as a telltale indicator of an auxiliary circuit in which the amperage is beyond the calibrated range of the ammeter.

Other objects will appear from the description to follow, in connection with which for the purposes of the present application, I have illustrated one embodiment of the invention in the accompanying drawing, in which:

Figure I is a perspective view of a vehicle engine manifold together with the wires and instruments involved in the invention and with related parts of the vehicle shown in broken lines.

Fig. II is a diagrammatic view of the electric circuit.

Referring to the drawing, in which like characters refer to like parts throughout the views, 1 is a current source which normally supplies current to the usual vehicle parts such as light 2 by means of conductors 3, 4, 5 and 6. A switch 7 and an ammeter 8 are included in the normal circuit, switch 7 being of any suitable type but the ammeter 8 is preferably of a type to indicate but slightly more than the normal current consumption so that the greater portion of indicating scale may be utilized for insuring accurate reading of the instrument. A second circuit for heating the fuel vaporizers 9 in the manifold 10 is led from a point 11 in the main circuit, such as the usual starting switch 12, to a switch 13 by conductor 14 and from thence by conductor 14A through vaporizers 9 and back to the source through the ground, as indicated in Fig. II.

The vaporizers ordinarily use a much greater amount of current than the normal requirements of the vehicle and because of this the heating current is dangerously high for a current indicator that will give substantially a full scale reading under normal conditions. It is important that some indication of the flow of current be given, but it is not necessary to indicate the flow in any standard units, such as are used for measuring the normal circuit. The present invention permits the current indicator to serve the dual purpose of indicating the normal circuit in standard units and the auxiliary circuits in arbitrary units, by shunting the indicator around a portion 14 of the auxiliary circuit and including a suitable resistance unit 15 in the shunt, which is adapted to pass such a portion of the total heating current as will give a scale reading on the indicator that is substantially equivalent to that of the normal circuit.

In the operation of the vehicle the switch 13 will ordinarily be in the open position and switch 7 will be in the closed position, the larger amount of the normal circuit current being led through the indicator 8, which is preferably calibrated to read in amperes. During the occasional use of the heating circuit, the switch 13 is closed but the current divides at 11 and unites at 16, the portion passing through the indicator being dependent on the inverse ratio between the indicator shunt resistance and the resistance of portion 14. Switch 7 may be either open or closed during the use of the heating circuit, as the indication in the meter is only for the purpose of showing the position of switch 13, but care should be taken to select a resistance unit 15 that will not pass enough current to damage the indicator when switches 7 and 13 are closed at the same time.

While I have illustrated and described, somewhat in detail, one embodiment of the invention, it is to be understood that this showing and description are illustrative only, and that I do not regard my invention as limited to the details of construction illustrated and described, except insofar as I have included such limitations within the terms of the following claim.

I claim as my invention:

A tell-tale device for an automobile fuel vaporizer, said automobile having a storage battery and an electrical device requiring a small current included in the normal circuit, said normal electric circuit for the automobile having an ammeter connected therein, an electrical fuel vaporizer including electrical means requiring a large current and an independent circuit from the source of energy for the vaporizer including a switch and a low value resistor, a shunt circuit across said resistor comprising a high value resistor and the ammeter in series.

EDWARD E. HUNTINGTON.